Dec. 30, 1969    H. J. L. SMITH    3,486,205

QUICK RELEASE FASTENER

Filed May 27, 1968

Inventor
HOWARD JOHN LEONARD SMITH

By Daniel H. Kane
Attorney 3,486,205
QUICK RELEASE FASTENER
Howard John Leonard Smith, Farnham, England, assignor to Dzus Fastener Co., Inc., West Islip, N.Y., a corporation of New York
Filed May 27, 1968, Ser. No. 732,164
Claims priority, application Great Britain, June 7, 1967, 26,332/67
Int. Cl. F16b 21/04
U.S. Cl. 24—221
1 Claim

ABSTRACT OF THE DISCLOSURE

In a quick release fastener of the kind used for fastening together two parts such as panels and consisting of two components, a stud and a retaining member, the retaining member is moulded from a resilient plastics material integrally with two C-shaped supporting webs which form, with the retaining member, a continuous loop. The retaining member has a socket with cam surfaces which cooperate with lugs on a stud.

This invention relates to quick release fasteners of the kind which are used for holding together two parts, such as panels, and which consist of two components, a stud and a retaining member. In use, the shank of the stud passes through a hole in one part and, upon rotation of the stud through a part turn, co-operates with the retaining member secured to the other part to hold the two parts together.

If the two parts are to be held together face to face, the retaining member will be secured to the back of the second part and the stud shank will pass through aligned holes in both parts. The retaining member is resiliently mounted and is strained towards the first part both to hold the two parts tightly together and to prevent the stud shank from becoming disengaged from the retaining member. The stud may be captive but rotatable in the hole in the first part. With a fastener of this kind, two panels, or other parts, can be held together simply by rotating the head of the stud from the front of the first part without the necessity of providing access to the second part.

One common form of retaining member consists of an S-shaped spring wire rivetted to a base plate which is, in use, fixed to the second of the parts to be held together. The stud then has a part helical cam slot which receives and retains the wire upon co-operation of the stud and retaining member. The construction of a retaining member assembly of this form involves a number of separate steps and is therefore appreciably expensive.

In accordance with this invention a retaining member assembly for a fastener of the kind described comprises a retaining member which is arranged to co-operate, by relative rotation, with a suitable stud and which is integrally moulded from a resilient plastics material with, and at one end of a C-shaped supporting web, the other end of the web being arranged to be secured to the second one of two parts to be held together.

With this arrangement, the retaining member can be moved towards or away from the second part against the resilience of the supporting web and the length of the stud can be chosen so that, when the parts are held together, the supporting web is flexed from its natural, unstrained position and resiliently urges the two parts together. Since relatively large movements of the retaining member relative to the second part are possible, the same length of stud can be used to fasten together parts of different thicknesses.

Preferably there are two supporting webs, one on each side of the retaining member forming, with the retaining member a bow shape. The two supporting webs may then be continuous with one another to form, with the retaining member, a loop. If the retaining member is to be secured to the back of the second part, the base part of the loop joining the other ends of the webs will be formed with an opening through which the shank of the stud can pass to the retaining member.

A suitable form of retaining member has a socket to receive the shank of the stud and cam surfaces within the socket to cooperate with one or more lugs on the stud. The cam surfaces preferably provide an indented position, in which the lugs can be retained, and stops to prevent the lugs passing too far beyond this position.

The retaining member assembly may be secured to the second one of the two parts to be held together in any convenient way, by rivets for example, but the end of the web which is to be secured to the part may have a boss projecting away from the retaining member and formed with a pair of outward facing lips which can be resiliently moved inwards towards one another, the arrangement being such that the boss can be forced through a suitable hole in the part from one side with the lips moved towards one another until the lips spring outwards on the other side of the hole thus retaining the assembly in position.

One example of a quick release fastener incorporating a retaining member assembly in accordance with the invention is illustrated in the accompanying drawings in which.

Figure 1:
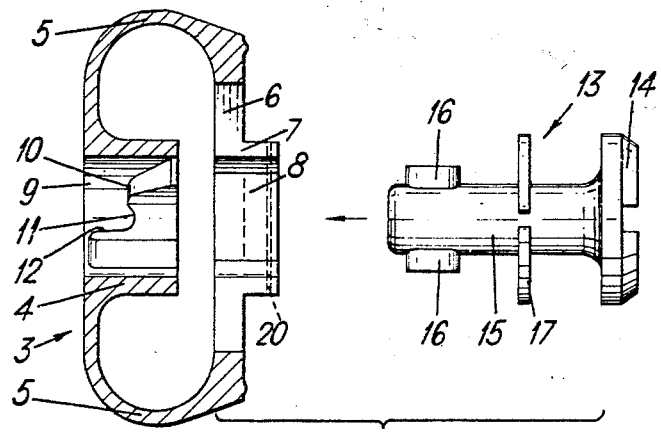
FIGURE 1 is an elevation with the retaining member assembly in section.

In FIGURE 1, the retaining member assembly 3 is formed from resilient plastics material and includes a receptacle 4, two C-shaped webs 5 and a base portion 6 formed with a securing boss 7. These parts together form a continuous closed loop.

The securing boss 7 and the receptacle 4 are formed with aligned holes 8 and 9 respectively. The hole 9 is provided with a pair of symmetrically arranged cam surfaces each consisting of a part helical portion 10, and an indented portion 11 which terminates in a stop 12.

A cooperating stud 13 has a slotted head 14 and a shank 15 which is formed with a pair of diametrically opposed lugs 16. A resilient split washer 17 surrounds the shank 15 gripping it lightly.

Figure 2:
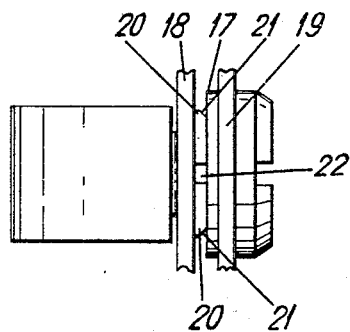
FIGURE 2 is a plan showing the fastener holding two panel sections together.

In FIGURE 2 the fastener is shown holding two panels 18 and 19 together. The panel 19 is formed with a round hole large enough to admit the shank 15 and the lugs 16 of the stud but smaller than the washer 17. In use, the washer 17 is removed from the shank, the shank is passed through the hole and the washer is replaced to hold the stud captive in the hole. The panel 18 is formed with a rectangular hole in which the securing boss 7 is a snap fit by virtue of two lips 20 which engage the base of the plate around the hole opposite the rest of the retaining member assembly. To enable the boss to be inserted into the hole the lips are formed with cam surfaces 21 and the boss and the base portion 6 have a slot 22 which enables the two lips to be resiliently moved towards one another.

To fasten the panels 18 and 19 together the shank 15 is passed through the hole 8 in the boss and is then rotated through half a turn whereupon the lugs 16 ride up the part helical portions 10 of the cam surfaces and snap into the indented portions 11. The stops 12 prevent any further turning of the stud.

The C-shaped webs 5 flex as the stud is turned drawing the receptacle 4 towards the panel 18 and permit a range of different thicknesses of panels 18 and 19 to be held together firmly using just the one size of stud.

If the retaining member assembly 3 is to be riveted to the panel 18, it is formed without the securing boss 7 and holes for rivets are formed above and below the hole 8, as seen in FIGURE 1, instead of the slot 22.

I claim:
1. A fastener receptacle for use with a fastener stud of the type having a shank portion and a cross arm, said receptacle comprising a unitary member made of resilient plastic material and having a base portion for mounting on a support formed with a central aperture for receiving the shank portion of the stud, a pair of resilient C shaped loop portions extending outwardly from opposite ends from the base portion, and a retaining portion integrally secured to the outer ends of the C shaped loop portions and normally held in spaced relationship thereby from the base portion but shiftable against the resilient force exerted by the loop portions towards the base portion, said base portion having a central aperture with cam surfaces formed therein to receive and engage the cross arm on the shank of the stud and being provided with a collar-like flange portion surrounding the aperture and projecting towards the base portion whereby when the crossarm of the stud is engaged with the cam surfaces in the aperture and a force in tension is exerted between the fastener stud and the receptacle relative movement of the retaining portion of the receptacle towards the base portion is limited by engagement of the flange portion with the base portion.

References Cited

UNITED STATES PATENTS

| | | | |
|---|---|---|---|
| 510,245 | 12/1893 | Dorr | 151—38 |
| 1,505,508 | 8/1924 | Trager | 85—62 |
| 2,397,889 | 4/1946 | Taylor | 24—221.2 |
| 2,421,204 | 5/1947 | Jung | 24—221.2 |
| 2,830,486 | 4/1958 | Dillon | 85—62 |
| 3,181,585 | 5/1965 | Brewington | 151—41.75 |
| 3,209,425 | 10/1965 | Barry et al. | 24—221 |
| 3,314,465 | 4/1967 | Bien | 151—41.75 |
| 3,407,454 | 10/1968 | Myatt | 24—221 |

FOREIGN PATENTS 40,199  7/1965  Germany.

MARION PARSONS, Jr., Primary Examiner

U.S. Cl. X.R.

85—5, 62; 151—38